Dec. 6, 1960  H. B. MATTHEWS  2,963,316
BACKLITE SUNSHADE

Filed Nov. 24, 1958  3 Sheets-Sheet 1

INVENTOR.
Hugh B. Matthews
BY
R. H. Barnard
ATTORNEY

Dec. 6, 1960
H. B. MATTHEWS
2,963,316
BACKLITE SUNSHADE
Filed Nov. 24, 1958
3 Sheets-Sheet 2
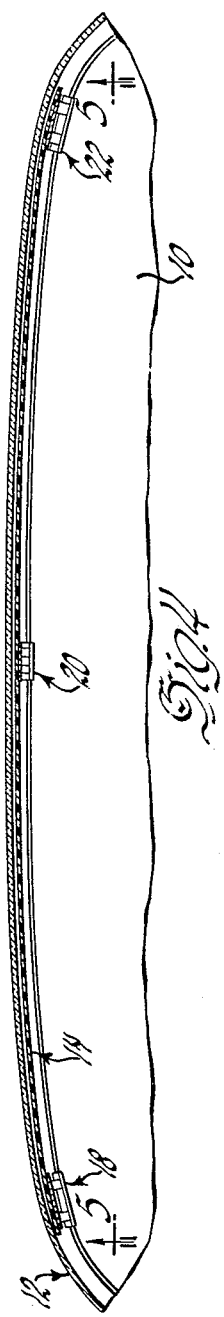
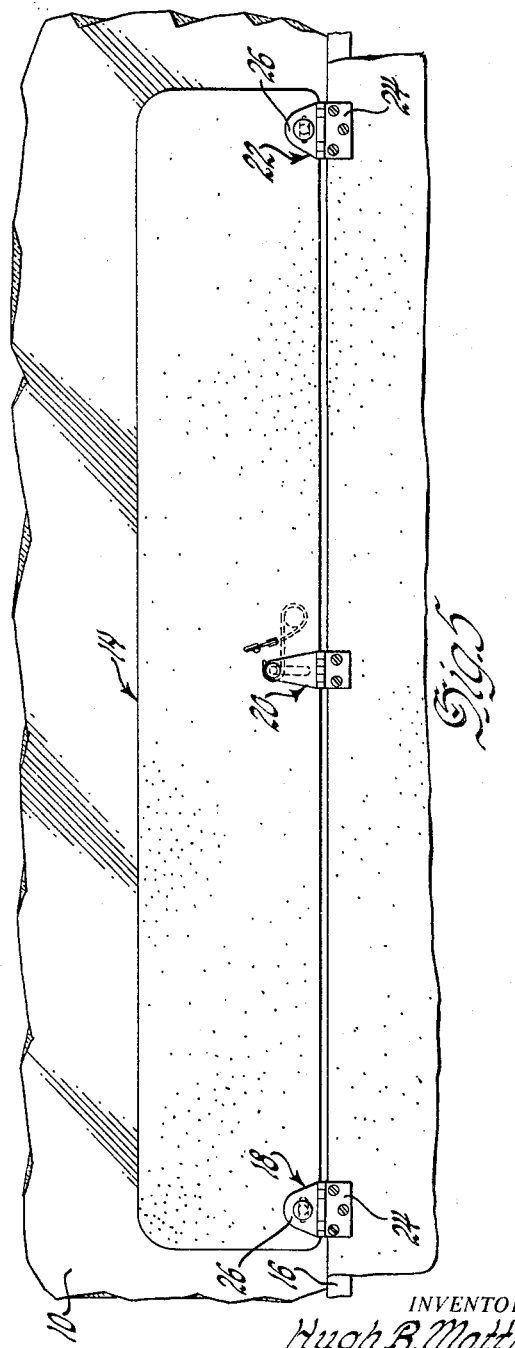
INVENTOR.
Hugh B. Matthews
BY
R. H. Barnard
ATTORNEY Dec. 6, 1960 H. B. MATTHEWS 2,963,316
BACKLITE SUNSHADE
Filed Nov. 24, 1958 3 Sheets-Sheet 3
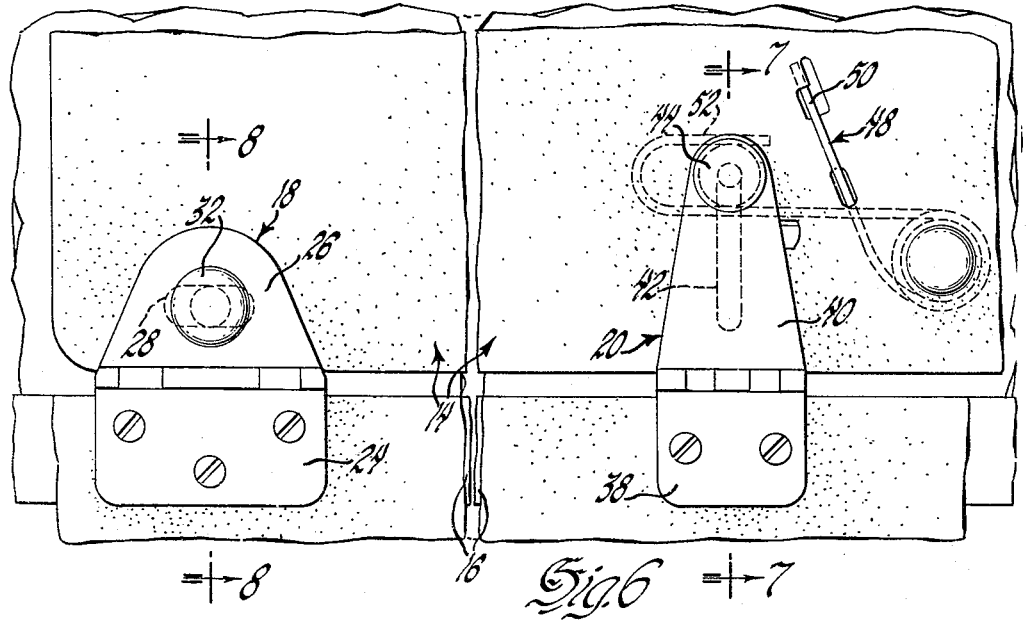
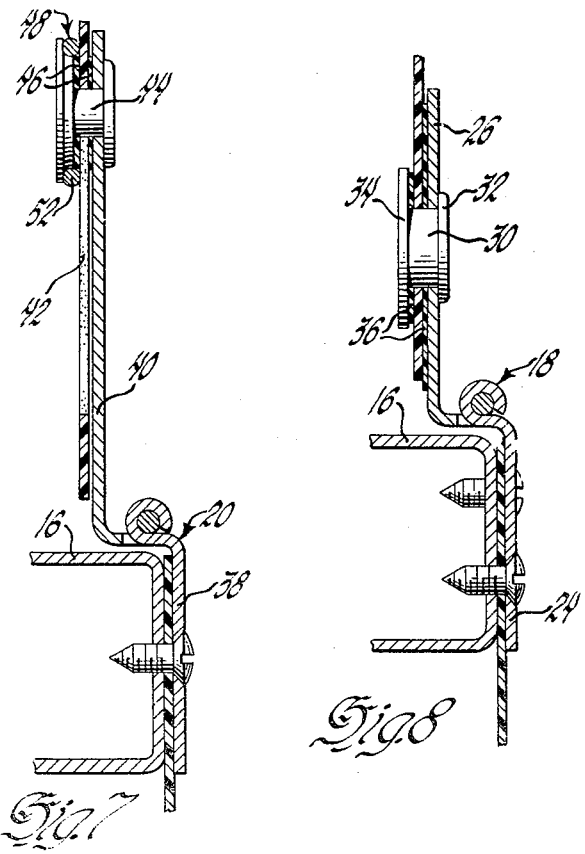
INVENTOR.
Hugh B. Matthews
BY
R. R. Barnard
ATTORNEY United States Patent Office 2,963,316
Patented Dec. 6, 1960

2,963,316

BACKLITE SUNSHADE

Hugh B. Matthews, Birmingham, Mich., assignor to General Motors Corporation, Detroit, Mich., a corporation of Delaware Filed Nov. 24, 1958, Ser. No. 775,942

1 Claim. (Cl. 296—97)

The present invention relates to an improved type sunshade particularly adapted for use with automobiles utilizing windows which present a considerable upper surface to the rays of the sun. With the advent of vehicle windows which extend upwardly an appreciable distance to encompass areas formerly covered by the vehicle roof, passengers may be subjected to rather intense heat from the sun. In order to retain the viewing advantages of such windows and at the same time insure passenger comfort, the subject sunshade has been developed which permits such windows to be partially blocked from the rays of the sun and at the same time permits the shade to be withdrawn from the window when it is no longer required.

While it is broadly old to provide sunshades for vehicle windows whether front or back, the curvilinear construction of roof lines as well as windows as is currently in vogue creates additional problems in sunshade construction which are not encountered with more or less flat type windows as have been used in the past. To be effective in shading the type of curved windows contemplated, it is necessary that the sunshade extend substantially completely across or transversely of the window. In so extending, such sunshade itself must conform to the curvilinear window and body construction in order that it may be mounted close to the roof so as to be movable to a non-interfering position when its use is not required.

In one form the subject sunshade can be made of a flexible material and mounted in such a way as to conform to the curved roof and window lines. To move the subject sunshade from its operative to an inoperative position, it is necessary that the shade be rotated through substantially 180°. With this type of rotation, it is apparent that the sunshade is subjected to considerable flexure in moving from one position to the other.

The preferred form of sunshade, as shown and described, is, however, made of a thin material formed by stamping or other means into a compound curvature corresponding to the average transverse and longitudinal roof and window curvatures. The narrower or longitudinal curvature is very slight, perhaps in the nature of $\frac{1}{16}$ of an inch. This construction results in a sunshade structure which places very little strain on the attaching hinges when in use or stored.

The compound curvature of the sunshade provides an "oilcan" type snap action from one curvature to another as the shade is rotated between the "use" and "storage" positions. It is apparent that such a change in curvature is necessary where such a shade is adapted to be rotated through approximately 180°. At some predetermined point in the rotation of the shade between its "use" and "storage" positions the shade pops or "oilcans" from one curvature to the opposite curvature whereby in either position the shade will assume the general curvature of the adjacent roof and window.

Another distinct advantage of the compound curvature of the sunshade is the rigidity achieved thereby. Consequently it is possible to use thinner material than would be otherwise required. Further, less body vibration is transmitted to the shade which due to its construction is not under tension at the hinges.

The hinge construction whereby the sunshade is articulated to the body is an important aspect of the present invention. In general, the hinges are constructed in a way which reduces the strain transmitted to the shade.

The details as well as other objects and advantages of the present invention will be apparent from a perusal of the detailed description which follows.

In the drawings:

Figure 4 is a view along line 4—4 of Figure 2;

Figure 5 is a bottom view of the sunshade in its operative position;

Figure 6 is a partial enlargement of Figure 5;

Figure 7 is a view along line 7—7 of Figure 6; and

Figure 8 is a view along line 8—8 of Figure 6.

Figure 1:
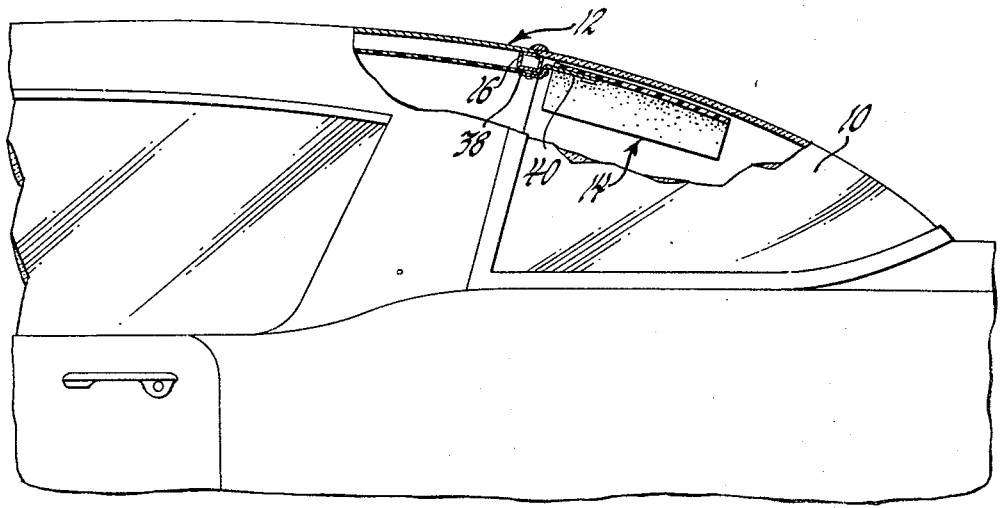
Figure 1 is a partially broken away view of a vehicle embodying the subject invention.
Figure 2:
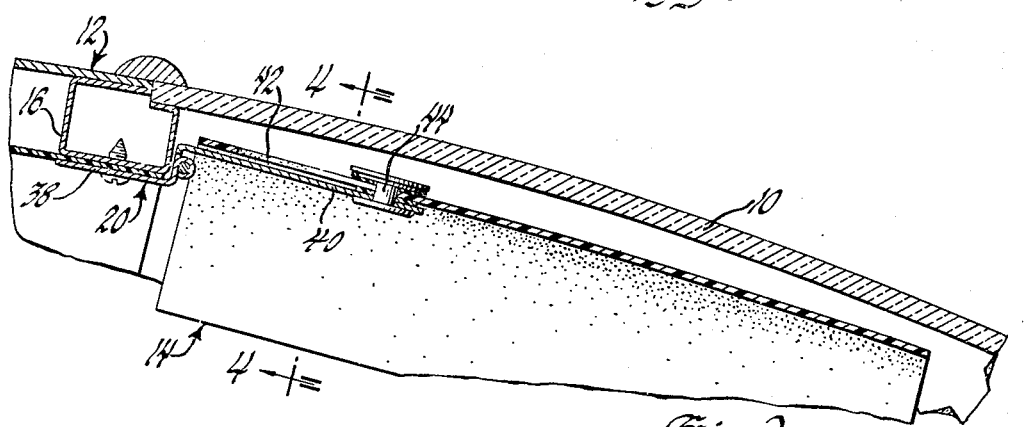
Figures 2 and 3 are sectional views showing the sunshade in operative and inoperative position.
Figure 3:
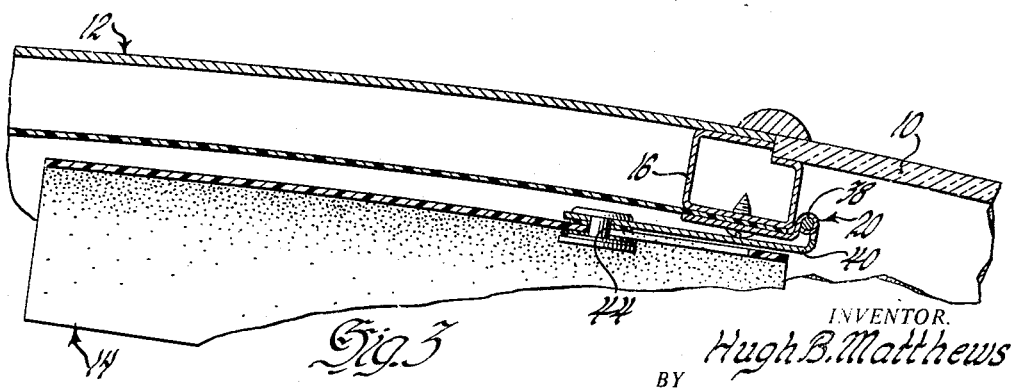

While the subject sunshade is of geeral utility with any window having a significant exposure to the rays of the sun or other undesired light source, it is particularly adapted to the backlite or rear window such as is illustrated at 10 on vehicle 12 of Figure 1.

Sunshade 14 is made of flexible tempered metal or plastic so as to be capable of flexure to conform with the curved vehicle roof line as best seen in Figure 4. As noted, in the illustrated and preferred form of the invention sunshade 14 is stamped from a thin metal material and is of a compound curvature so as to conform to the longitudinal as well as transverse curvature of the vehicle roof and window 14. Sunshade 14 is secured to the rear roof rail header 16 by three hinges indicated generally at 18, 20 and 22.

The outboard pair of hinges 18 and 22 are of identical construction but differ somewhat from the center hinge 20. Since they are identical only one outboard hinge will be described in detail. Outboard hinge 18 includes a hinge leaf 24 secured to header 16 and a hinge leaf 26 secured to sunshade 14. As best seen in Figure 4, the hinge axes of outboard hinges 18 and 22 are angularly disposed to the axis of the center hinge 20. This angular relationship is due to the curved nature of the roof line and which hinge axis inclination also facilitates a change of sunshade curvature as the shade is rotated between "use" and "storage" positions.

Due to the curved nature of the roof line and the corresponding curvature of sunshade 14, it is apparent that a considerable strain would be imposed on the hinges and shade when the latter was rotated between operative and inoperative position. Such strain is naturally greatest when the sunshade reverses its curvature as it is rotated through substantially 180°. Accordingly, a unique hinge construction is provided whereby the snapping of the sunshade in reversing curvature may be accommodated without destroying either the hinge or the shade.

As best seen in Figure 6, sunshade 14 is provided with slots 28 subadjacently disposed to the outboard hinges 18 and 22. A stud 30 is secured to hinge leaf 26 and projects within slot 28 in the sunshade to permit the sunshade to move relative to the hinge. Stud 30 includes flattened or head portions 32 and 34 for retaining the hinge to the shade. The slots 28 are generally alinged in the same direction as the hinge axes and disposed transversely of the vehicle center line. The particular slot direction is calculated to accommodate the direction and amount of sun shade movement which occurs at the outboard hinges.

Nylon washers 36 are provided between the stud head 34 and sunshade and between the hinge leaf 26 and the sunshade. The nylon washers afford easier sliding of the sunshade at the hinge attaching points and also serve to prevent rattles.

Center hinge 20 includes a hinge leaf 38 secured to header 16 and a hinge leaf 40 secured to sunshade 14. Sunshade 14 is provided with a slot 42 disposed longitudinally of the vehicle body or normal to the associated hinge axis. As with the outboard hinges, a stud 44 is secured to hinge leaf 40 and is movable in the slot 42 upon nylon washers 46. Here again the direction of center slot 42 is calculated to accommodate flexure movement of the sunshade at the central portion thereof when it "oilcans."

A coiled torsion spring 48 has one leg 50 thereof secured to sunshade 14 and the other leg 52 engaging the central stud 44 to bias the remote end of slot 42 against stud 44.

I claim:

A sunshade of the type adapted to be mounted on a body structure proximate a window such that the shade may be rotated to partially block light rays from entering said window, said body and said window having a curved cross section, said sunshade being of flexible construction whereby it may conform to the curvature of said curved cross section, and a plurality of hinges secured at one end to said body proximate said window and secured at their other end to said sunshade, said plurality of hinges including a pair of hinges secured to said sunshade at the transversely outer edges thereof, the axes of said hinges extending generally transversely of said body, a pair of slots respectively formed in said sunshade proximate said outer hinges, a stud member associated with each of said outer hinges and adapted to extend through said slots, said slots extending generally parallel to the axes of said outboard hinges permitting said sunshade to move relative to said outer hinges during the rotation thereof, and a centrally disposed hinge, a slot formed in said sunshade proximate said central hinge, said latter slot extending in a direction generally normal to the central hinge axis, a stud member associated with said central hinge and extending through said slot to permit the central portion of said shade to move in the direction of said slot relative to the central hinge.

References Cited in the file of this patent

UNITED STATES PATENTS

| 1,715,612 | McCulloch | June 4, 1929 |
| 1,720,280 | Kirchner | July 9, 1929 |

FOREIGN PATENTS

| 1,104,147 | France | June 8, 1955 |
| 574,526 | Great Britain | Jan. 9, 1946 |